United States Patent
Cambois et al.

(10) Patent No.: US 8,730,760 B2
(45) Date of Patent: May 20, 2014

(54) METHOD FOR SEISMIC SURVEYING USING WIDER LATERAL SPACING BETWEEN SOURCES TO IMPROVE EFFICIENCY

(75) Inventors: Guillaume Cambois, Oslo (NO); Orjan Myrvold, Singapore (SG)

(73) Assignee: PGS Geophysical AS, Oslo (NO)

( * ) Notice: Subject to any disclaimer, the term of this patent is extended or adjusted under 35 U.S.C. 154(b) by 418 days.

(21) Appl. No.: 13/066,035

(22) Filed: Apr. 5, 2011

(65) Prior Publication Data

US 2012/0257474 A1    Oct. 11, 2012

(51) Int. Cl.
G01V 1/38    (2006.01)

(52) U.S. Cl.
CPC ............... *G01V 1/38* (2013.01); *G01V 1/3808* (2013.01)
USPC .............................................. 367/16; 367/20

(58) Field of Classification Search
USPC ................................ 367/15, 20; 181/110–112
See application file for complete search history.

(56) References Cited

U.S. PATENT DOCUMENTS

| | | | |
|---|---|---|---|
| 4,481,611 A | 11/1984 | Burrage | |
| 4,727,956 A * | 3/1988 | Huizer | 181/111 |
| 5,281,773 A * | 1/1994 | Duren | 181/111 |
| 5,443,027 A | 8/1995 | Owsley et al. | |
| 5,771,202 A * | 6/1998 | Bale et al. | 367/20 |
| 6,011,752 A | 1/2000 | Ambs et al. | |
| 6,144,342 A | 11/2000 | Bertheas et al. | |
| 6,882,938 B2 | 4/2005 | Vaage et al. | |
| 7,092,315 B2 | 8/2006 | Olivier | |
| 7,376,045 B2 | 5/2008 | Falkenberg et al. | |
| 7,423,929 B1 | 9/2008 | Olivier | |
| 2004/0013037 A1 * | 1/2004 | Vaage | 367/21 |
| 2005/0027454 A1 * | 2/2005 | Vaage et al. | 702/17 |
| 2006/0227658 A1 * | 10/2006 | Toennessen et al. | 367/18 |
| 2006/0239117 A1 * | 10/2006 | Singh et al. | 367/20 |
| 2007/0223307 A1 | 9/2007 | Storteig et al. | |
| 2007/0294036 A1 * | 12/2007 | Strack et al. | 702/14 |
| 2008/0008033 A1 | 1/2008 | Fossum et al. | |
| 2009/0296520 A1 * | 12/2009 | Keers et al. | 367/20 |
| 2010/0027374 A1 * | 2/2010 | Moldoveanu et al. | 367/16 |
| 2010/0118645 A1 | 5/2010 | Welker | |
| 2011/0242935 A1 * | 10/2011 | Amundsen et al. | 367/21 |

FOREIGN PATENT DOCUMENTS

| | | |
|---|---|---|
| EP | 2280294 A2 | 2/2004 |
| GB | 2429541 A | 11/1926 |
| RU | 7212 U1 | 7/1998 |

OTHER PUBLICATIONS

A. V. Lytkin, Eurasian Search Report, Date of Mailing: Oct. 22, 2012.

* cited by examiner

*Primary Examiner* — Ian J Lobo (57) ABSTRACT

A method for towing a marine seismic acquisition array in a body of water includes towing a plurality of laterally spaced apart sensor streamers behind a survey vessel in the water. A lateral spacing between adjacent streamers is represented by L. At least two laterally spaced apart seismic energy sources are towed behind the survey vessel. A lateral spacing between the at least two sources is represented by kL, wherein k is a constant and wherein k is at most equal to the number of streamers.

13 Claims, 5 Drawing Sheets

METHOD FOR SEISMIC SURVEYING USING WIDER LATERAL SPACING BETWEEN SOURCES TO IMPROVE EFFICIENCY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine geophysical surveying. More particularly, the invention relates to methods for controlling the spatial distribution or geometry of an array of geophysical sensor streamers towed behind a survey vessel.

2. Background Art

Marine geophysical surveying systems such as seismic acquisition systems and electromagnetic survey systems are used to acquire geophysical data from formations disposed below the bottom of a body of water, such as a lake or the ocean. Marine seismic surveying systems, for example, typically include a seismic survey vessel having onboard navigation, seismic energy source control, and geophysical data recording equipment. The seismic survey vessel is typically configured to tow one, or more typically a plurality of laterally spaced apart sensor streamers through the water. At selected times, the seismic energy source control equipment causes one or more seismic energy sources (which may be towed in the water by the seismic vessel or by another vessel) to actuate. Signals generated by various sensors on the one or more streamers in response to detected seismic energy are ultimately conducted to the recording equipment. A record with respect to time is made in the recording system of the signals generated by each sensor (or groups of such sensors). The recorded signals are later interpreted to infer the structure and composition of the formations below the bottom of the body of water. Corresponding components for inducing electromagnetic fields and detecting electromagnetic phenomena originating in the subsurface in response to such imparted fields may be used in marine electromagnetic geophysical survey systems.

The one or more sensor streamers are in the most general sense long cables that have geophysical sensors disposed at spaced apart positions along the length of the cables. A typical streamer can extend behind the geophysical survey vessel for several kilometers. Because of the great length of the typical streamer, the streamer may not travel entirely in a straight line behind the survey vessel at every point along its length due to interaction of the streamer with the water and currents in the water, among other factors.

Streamers towed by a vessel configured for towing multiple streamers are associated with equipment that typically maintain the forward ends of the streamers at selected lateral distances from each other and from the centerline of the survey vessel as they are towed through the water. Such multiple streamer systems are used in what are known as three dimensional and four dimensional geophysical surveys. A four dimensional seismic survey is a three dimensional survey over a same area of the Earth's subsurface repeated at selected times. The individual streamers in such systems are affected by the same forces that affect a single streamer.

The quality of geophysical images of the Earth's subsurface produced from three dimensional surveys is affected by how well the positions of the individual sensors on the streamers are controlled. The quality of images generated from the detected signals also depends to an extent on the relative positions of the sensors being maintained throughout the geophysical survey. Various devices are known in the art for positioning streamers laterally and/or at a selected depth below the water surface. U.S. Pat. No. 5,443,027 issued to Owsley et al., for example, describes a lateral force device for displacing a towed underwater acoustic cable that provides displacement in the horizontal and vertical directions. However, the device disclosed in the Owsley et al. patent provides no active control of direction or depth of the streamer.

U.S. Pat. No. 6,011,752 issued to Ambs et al. describes a seismic streamer position control module having a body with a first end and a second end and a bore therethrough from the first end to the second end for receiving a seismic streamer. The module has at least one control surface, and at least one recess in which is initially disposed the at least one control surface. The at least one control surface is movably connected to the body for movement from and into the at least one recess and for movement, when extended from the body, for attitude adjustment. Generally, the device described in the Ambs et al. patent is somewhat larger diameter, even when closed, than the streamer to which it is affixed, and such diameter may become an issue when deploying and retrieving streamers from the water.

U.S. Pat. No. 6,144,342 issued to Bertheas et al. describes a method for controlling the navigation of a towed seismic streamer using "birds" affixable to the exterior of the streamer. The birds are equipped with variable-incidence wings and are rotatably fixed onto the streamer. Through a differential action, the wings allow the birds to be turned about the longitudinal axis of the streamer so that a hydrodynamic force oriented in any given direction about the longitudinal axis of the streamer is obtained. Power and control signals are transmitted between the streamer and the bird by rotary transformers. The bird is fixed to the streamer by a bore closed by a cover. The bird can be detached automatically as the streamer is raised so that the streamer can be wound freely onto a drum. The disclosed method purportedly allows the full control of the deformation, immersion and heading of the streamer.

The above devices can provide some degree of control over the geometry of a plurality of laterally spaced apart sensor streamers towed by a vessel. Variations in environmental conditions, for example, high velocity water currents in a direction transverse to the motion of the vessel, cross winds, and high waves, may require that the geometry of the streamers is adjusted in response.

What is needed is a method to increase surveying efficiency in various environmental conditions in the body of water through which the streamers are towed.

SUMMARY OF THE INVENTION

A method for towing a marine seismic acquisition array in a body of water includes towing a plurality of laterally spaced apart sensor streamers behind a survey vessel in the water. A lateral spacing between adjacent streamers is represented by L. At least two laterally spaced apart seismic energy sources are towed behind the survey vessel. A lateral spacing between the at least two sources is represented by kL, wherein k is a constant and wherein k is at most equal to the number of streamers.

A method for towing a marine seismic acquisition array in a body of water according to another aspect of the invention includes towing a plurality of laterally spaced apart sensor streamers behind a survey vessel in the water. A lateral spacing between adjacent streamers is represented by L. At least two laterally spaced apart seismic energy sources are towed in the water. A lateral spacing between the at least two source is represented by kL, wherein k is a constant and wherein k is at most equal to the number of streamers. The sensor streamers are steered to a selected spread angle behind the survey vessel, and using seismic data from overlapping common depth point lines acquired laterally between the lateral positions of the sources to reduce infill acquisition.

Other aspects and advantages of the invention will be apparent from the following description and the appended claims.

DETAILED DESCRIPTION

Figure 1:
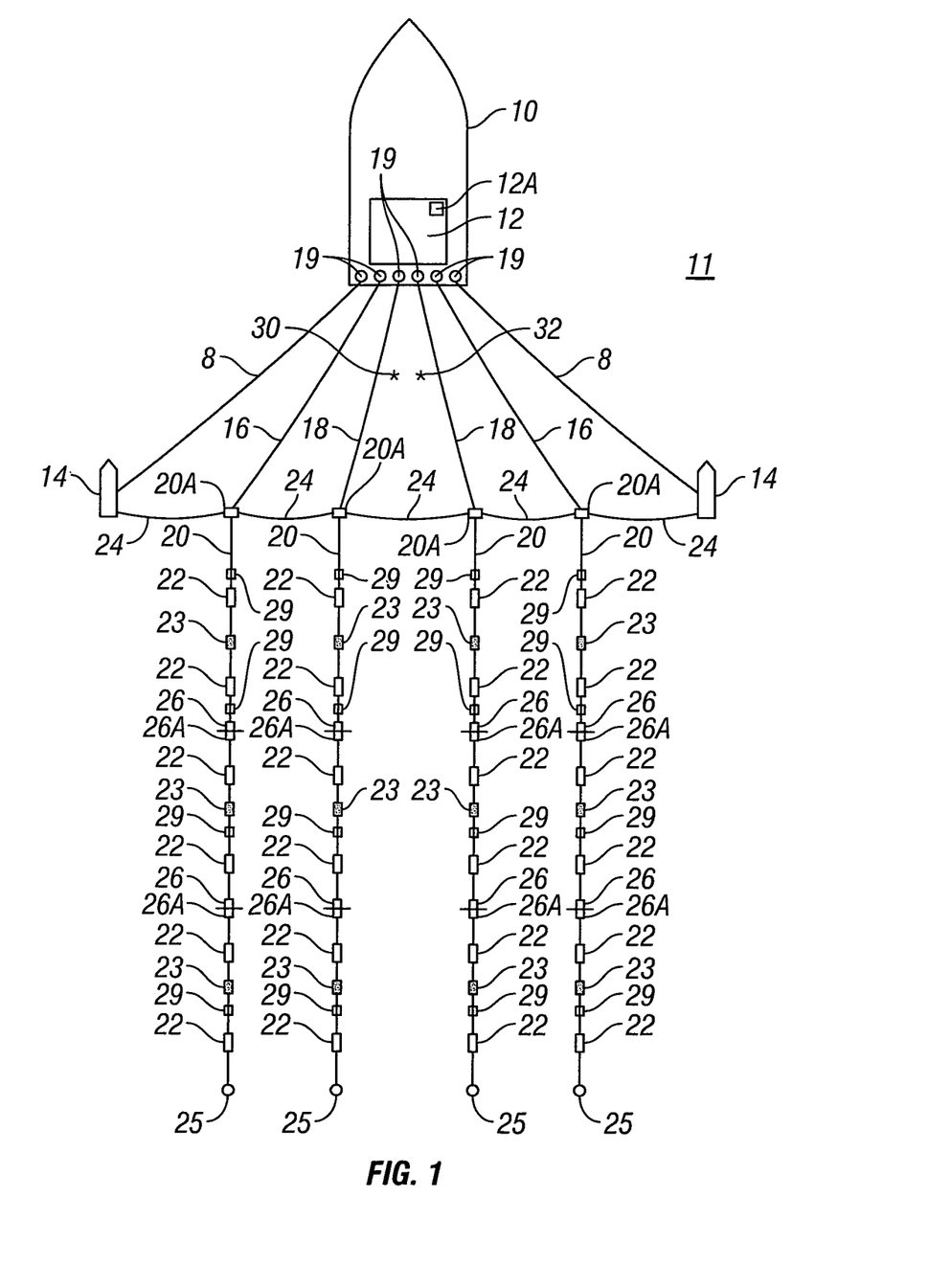
FIG. 1 shows an array of seismic streamers each including lateral force and depth control devices for adjusting geometry of the respective streamer.

A seismic surveying system shown in and described with reference to FIG. 1 is intended to illustrate the various components used with a typical three dimensional seismic survey in order to provide a better understanding of the invention. The various devices shown in FIG. 1 are not intended to limit the scope of the present invention.

The survey system includes a survey vessel 10 that moves along the surface of a body of water 11 such as a lake or the ocean. The survey vessel 10 may include thereon equipment, shown generally at 12 and for convenience collectively referred to as a "recording system." The recording system 12 typically includes devices (none shown separately) such as a data recording unit for making a record with respect to time of signals generated by various seismic sensors in the acquisition system. The recording system 12 also typically includes navigation equipment (not shown separately) to determine and record, at selected times, the geodetic position of the vessel 10, and using other devices to be explained below, each of a plurality of seismic sensors 22 disposed at spaced apart locations on streamers 20 towed by the survey vessel 10.

In one example, the device for determining the geodetic position may be a geodetic position signal receiver 12A such as a global positioning satellite ("GPS") receiver, shown schematically at 12A. Other geodetic position determination devices are known in the art. The foregoing elements of the recording system 12 are familiar to those skilled in the art, and with the exception of the geodetic position detecting receiver 12A, are not shown separately in the figures herein for clarity of the illustration.

The seismic sensors 22 can be any type of geophysical sensor known in the art. Non-limiting examples of such sensors may include particle motion-responsive seismic sensors such as geophones and accelerometers, pressure-responsive seismic sensors, pressure time gradient-responsive seismic sensors or combinations of the foregoing. The seismic sensors 22 may measure, for example, seismic energy primarily reflected from or refracted by various structures in the Earth's subsurface below the bottom of the water 11 in response to energy imparted into the subsurface by two seismic energy sources 30, 32. The recording system 12 may also include energy source control equipment (not shown separately) for selectively operating the energy sources 30, 32.

In the survey system shown in FIG. 1, there are four sensor streamers 20 towed by the survey vessel 10. The number of sensor streamers shown in FIG. 1, however, is only for purposes of explaining the invention and is not a limitation on the number of streamers that may be used in any particular geophysical survey system according to the invention. As explained in the Background section herein, in marine geophysical acquisition systems such as shown in FIG. 1 that include a plurality of laterally spaced apart streamers, the streamers 20 are typically coupled to towing equipment that secures the forward end of each of the streamers 20 at a selected lateral position with respect to adjacent streamers and with respect to the seismic vessel 10. As shown in FIG. 1, the towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. "Lateral" in the present context means transverse to the direction of motion of the survey vessel 10 in the water 11. The lateral motion component of each paravane 14 is opposed to that of the other paravane 14. The combined lateral motion component of the paravanes 14 separates the paravanes 14 from each other until they put into tension one or more spreader ropes or cables 24, functionally coupled end to end between the paravanes 14.

The sensor streamers 20 can each be coupled, at the axial end thereof nearest the vessel 10 (the "forward end"), to a respective lead-in cable termination 20A. The lead-in cable terminations 20A can be coupled to or associated with the spreader ropes or cables 24 so as to fix the lateral positions of the streamers 20 with respect to each other and with respect to the centerline of the vessel 10. Electrical and/or optical connection between the appropriate components in the recording system 12 and, ultimately, the geophysical sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the forward end of each streamer 20. Corresponding electrical and/or optical connection between the appropriate components of the recording unit 12 and the sensors 22 in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed. The type of towing equipment coupled to the forward end of each streamer shown in FIG. 1 is only intended to illustrate a type of equipment that can tow an array of laterally spaced apart streamers in the water. Other towing structures may be used in other examples of geophysical acquisition system according to the invention.

The acquisition system shown in FIG. 1 can also include a plurality of lateral force and depth ("LFD") control devices 26 cooperatively engaged with each of the streamers 20 at selected positions along each streamer 20. Each LFD control device 26 can include one or more rotatable control surfaces (not shown separately) that when moved to a selected rotary orientation with respect to the direction of movement of such surfaces through the water 11 creates a hydrodynamic lift in a selected direction to urge the streamer 20 in any selected direction upward or downward in the water 11 or laterally along the water surface with respect to the direction of motion of the vessel 10. Thus, such LFD control devices 26 can be used to maintain the streamers in a selected geometric arrangement. A non-limiting example of LFD device that may be used in some examples is described in U.S. Patent Application Publication No. 2008/0008033 filed by Fossum et al. The particular configuration of the LFD devices 26, however, is not a limit on the scope of the present invention. As previously explained, for purposes of the present invention it is only necessary for any devices used as are the LFD devices 26 to be able to apply a selectable lateral force to the associated streamers 20. Depth control of the streamers 20 may be provided passively, such as by providing the streamers 20 with a selected overall specific gravity, or by separate depth control devices (not shown). Therefore, any reference to "depth" control as provided by the LFD devices 26 is only intended to cover the present example implementation, such as using the device shown in the Fossum et al. '033 patent application publication referred to above. Any reference to active depth control of the streamers 20 is not a limit on the scope of the present invention. For purposes of defining the scope of the invention, therefore, the LFD devices 26 need only perform the function of "lateral force" control devices, and the inclusion of depth control as a part of the function of the LFD devices 26 explained herein is intended to ensure that those of ordinary skill in the art understand that the use of the example LFD devices 26 disclosed herein, and any other similar examples, are within the scope of the present invention.

In the present example, each LFD device 26 may include an associated position determination device. In one example, the position determination device may be an acoustic range sensing device ("ARD") 26A. Such ARDs typically include an acoustic transceiver or transmitter and electronic circuitry configured to cause the transceiver to emit pulses of acoustic energy. Travel time of the acoustic energy between a transmitter and a receiver disposed at a spaced apart position such as along the same streamer and/or on a different streamer, is related to the distance between the transmitter and a receiver, and the acoustic velocity of the water. The acoustic velocity can be assumed substantially not to change during a survey, or it can be measured by a device such as a water velocity test cell. Alternatively or additionally, acoustic range sensing devices ("ARDs") may be disposed at selected positions along each one of the streamers not collocated with the LFD devices 26. Such additional ARDs are shown at 23 in FIG. 1. Each of the ARDs 26A, 23 may be in signal communication with the recording system 12 such that at any moment in time the distance between any two ARDs 26A, 23 on any of the streamers 20 is determinable. One or more ARDs may be placed at selected positions proximate the aft end of the vessel 10 so that relative distances between the selected positions on the vessel 10 and any of the ARDs on the streamers may also be determined. A non-limiting example of an ARD and system used with such ARDs is described in U.S. Pat. No. 7,376,045 issued to Falkenberg et al. and assigned to the assignee of the present invention.

The streamers 20 may additionally or alternatively include a plurality of heading sensors 29 disposed at spaced apart positions along each streamer 20. The heading sensors 29 may be geomagnetic direction sensors such as magnetic compass devices affixed to the exterior of the streamer 20. One type of compass device is described in U.S. Pat. No. 4,481,611 issued to Burrage and incorporated herein by reference. The heading sensors 29 provide a signal indicative of the heading (direction with respect to magnetic north) of the streamer 20 at the axial position of the heading sensor 29 along the respective streamer. Measurements of such heading at spaced apart locations along each streamer may be used to interpolate the geometry (spatial distribution) of each streamer.

Each streamer 20 may include at the distal end thereof a tail buoy 25. The tail buoy 25 may include, among other sensing devices, a geodetic position signal receiver 25A such as a GPS receiver that can determine the geodetic position of each tail buoy 25. The geodetic position receiver 25A in each tail buoy 25 may be in signal communication with the recording system 12.

By determining the distance between ARDs 26A, 23, including the one or more ARDs on the vessel 10, and/or by interpolating the spatial distribution of the streamers from the heading sensor 29 measurements, an estimate of the geometry of each streamer 20 may be made. Collectively, the geometry of the streamers 20 may be referred to as the "array geometry." For purposes of defining the scope of the present invention, the various position measurement components described above, including those from the heading sensors 29, from the ARDs 26A, 23, and, if used, from the additional geodetic position receivers 25A in the tail buoys 25, may be used individually or in any combination. It is only necessary for purposes of the present invention to be able to reasonably estimate the relative position of each point along each streamer 20 with reference to the survey vessel 10, or as will be further explained, with reference to the position of the energy source 17. By appropriate selection of the positions along each streamer at which the various relative position measurement devices described above are disposed, it is possible to determine the array geometry without the need to measure, estimate or otherwise determine the absolute geodetic position at large numbers of positions along each streamer, such as by using a large number of GPS receivers. The ARDs and heading sensors may be referred to for convenience in defining the invention as "relative position determination" sensors. By determining relative positions at each point along each streamer with reference to a selected point on the survey vessel or the energy source, is it possible to determine the geodetic position of each such streamer point if the geodetic position of the vessel or the energy source is determined. As explained above, the navigation portion of the recording system 12 may include a GPS receiver or any other geodetic location receiver 12A. In some examples, the energy source 17 may also include a geodetic position location receiver 17A such as a GPS receiver. A particular example of a system for determining relative positions of the streamers using acoustic signals is described in the Falkenberg et al. patent referred to above.

As previously explained, the vessel 10 may also tow two source arrays 30, 32 such as air gun arrays. The recording system 12 includes equipment as explained above to actuate the source arrays 30, 32 at selected times. For purposes of defining the present invention, the term "source" may be used interchangeably with "source array" for purposes of defining the invention. The type of source is not a limitation on the scope of the present invention.

Figure 2:
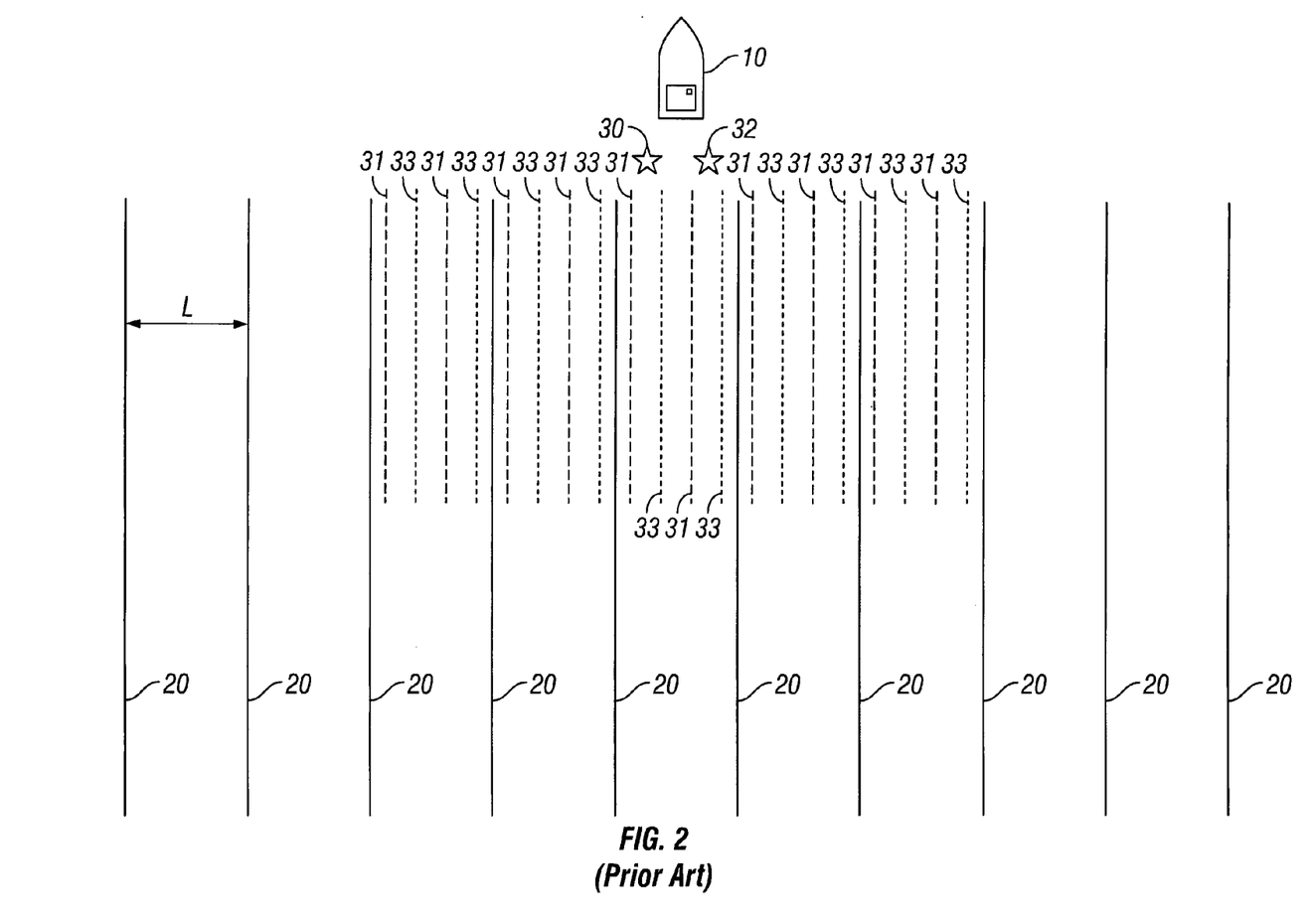
FIG. 2 shows a prior art arrangement of streamers and seismic sources.

Having explained acquisition systems that may be used in various examples, the principle of the invention will now be explained with reference to FIGS. 2 through 5. FIG. 2 illustrates three dimensional (3D) marine acquisition survey system geometry known in the art, wherein the sources 30, 32 are towed by the survey vessel 10. The vessel 10 tows a number, referred to by N, of streamers 20 (the other equipment associated with the streamers shown in FIG. 1 omitted in FIGS. 2 through 5 for clarity) substantially equally laterally distributed and separated laterally from each other by a distance represented by L. The vessel 10 also tows the two source arrays 30, 32 deployed symmetrically behind the vessel 10 as explained above and separated by a distance which is typically equal to L/2. The sources 30, 32 may be actuated alternatively and illuminate the subsurface according to common depth point (CDP) lines, shown at 31 resulting from the first source 30 and at 33 resulting from the second source 32. While the vessel 10 moves along the water (11 in FIG. 1), it acquires a number, 2N, of CDP lines (in this case twenty), separated from each other by a lateral distance of L/4. For an acquisition system having N streamers, with adjacent streamers being separated by a distance L, the area of the subsurface covered by a "sail line" (the vessel moving in one direction for a predetermined distance) is directly proportional to NL/2. In the present invention, the same vessel 10 is used to tow both the sources 30, 32 and the streamers 20.

The foregoing parameter NL/2 is important for the efficiency of 3 dimensional marine acquisition. The larger the value of the parameter, the more efficient the acquisition, that is, the greater the subsurface area coverage per unit time. However, other factors also affect survey efficiency, most notably "line turns" (when the vessel reverses direction and during which the system does not acquire any data) and any required infill data recording. Infill data recording may be required because during survey operations the streamers 20 do not extend substantially straight behind the vessel 10 and can occupy diverging positions from one sail line to the next. The divergence effects are typically more severe at longer offsets (longer distances between the vessel and any point along the length of the streamer 20) because at greater length there is progressively less control of the streamer's lateral position. Such effects are known as "feathering" and the "trousers effect."

The main source of cable feathering (and resulting need for infill) is water currents (tidal or otherwise). The trousers effect is generally due to the turbulences generated by the vessel 10, which tends to split the streamer spread in its lateral middle and push the halves of the spread outward (see FIG. 5 for example) from the centerline of the vessel 10. Infill requirements can be reduced to a certain extent using steerable devices (e.g., LFD devices 26 in FIG. 1) on the streamers 20 as explained above with reference to FIG. 1 to steer them back to extending straight behind the vessel 10. However, even with such LFD devices, there are limits to control over the geometry of the streamer array.

A proposed survey design according to one aspect of the invention includes setting the lateral spacing between the sources 30, 32 to a distance kL (wherein k≤N). In some cases the natural spreading ("trousers effect") of the steamers 20 (that is, lateral spacing from the centerline of the vessel increasing with distance from the vessel) may be deliberately maintained e.g., using LFD devices (26 in FIG. 1) rather than attempting to reduce it using the LFD devices (26 in FIG. 1)

Figure 3:
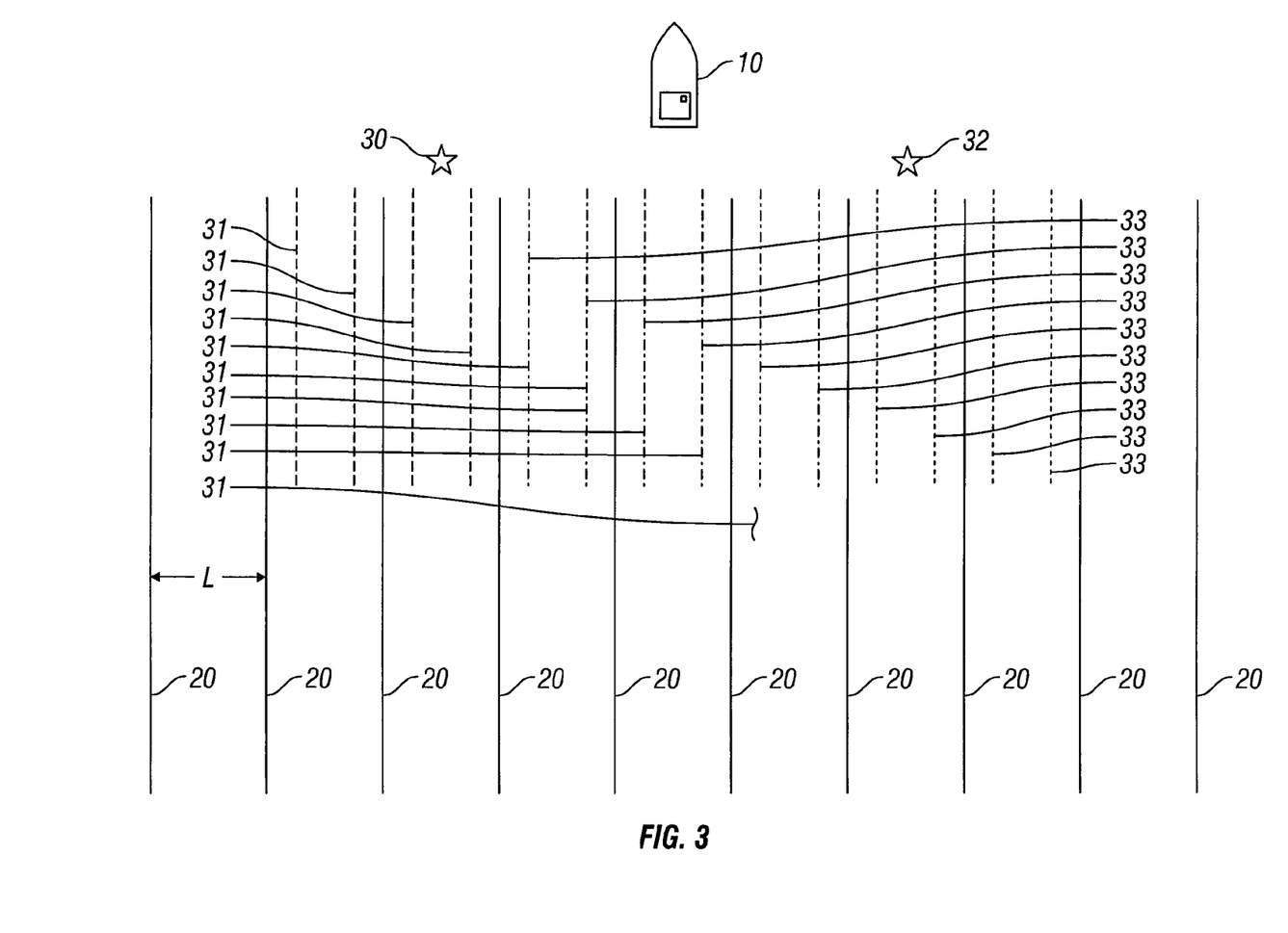
FIG. 3 shows one possible arrangement of streamers and sources according to the invention.
Figure 4:
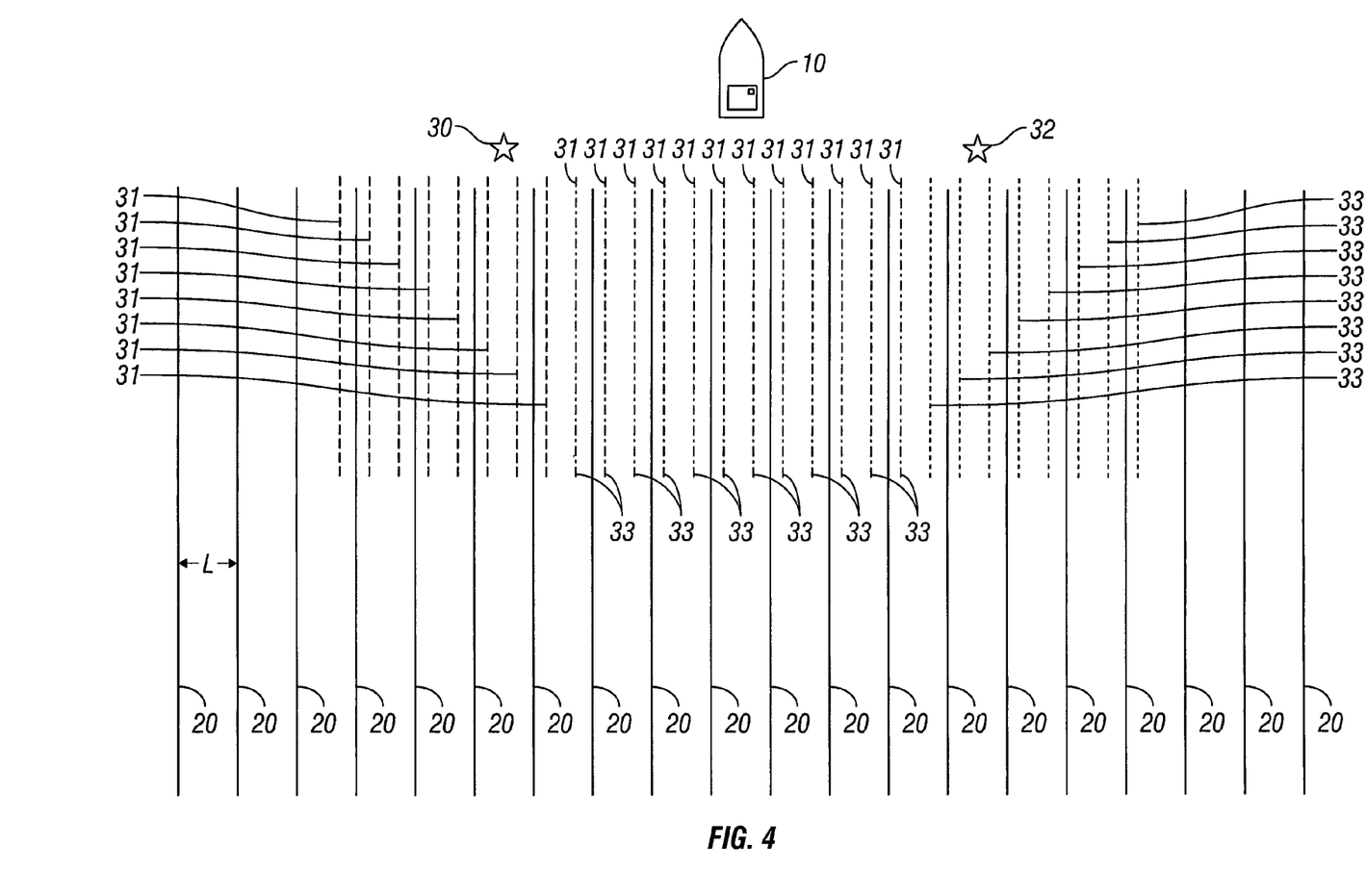
FIG. 4 shows one possible arrangement of streamers and sources according to the invention.

FIG. 3 illustrates the effect of having the sources 30, 32 disposed behind the vessel 10 with k=4, that is, the spacing is four times the lateral spacing, L, between adjacent streamers 20. FIG. 3 illustrates a first case having streamers 20 extend straight behind the vessel 10. With such system geometry, each sail line acquires a number, N+k, of CDP data lines (in the present example 14 such CDP lines) each separated from the adjacent CDP line laterally by L/2. The subsurface covered by such a sail line is directly proportional to (N+k)L/2. The productivity improvement compared to the acquisition known in the art wherein the source spacing is L/2 (see FIG. 2) is k/N (about 40% in the present example). A possible drawback to using the arrangement of FIG. 3 is that crossline sampling (lateral spacing between CDP lines) is L/2 instead of L/4. Coarser crossline sampling may not be an issue for large reconnaissance surveys (where productivity is the main factor) but may be a concern for high resolution surveys. If crossline sampling is a concern it is possible to double the number of streamers and divide their lateral separation by 2 (that is, make the lateral separation between adjacent streamers equal to L/2). The result would be L/4 crossline CDP spacing (as in FIG. 2) while maintaining the productivity improvement by having the sources 30, 32 spaced apart laterally by 4L. An example of such an arrangement, in which the lateral separation between adjacent streamers is L/2, rather than L, is shown in FIG. 4.

What should also be noted in reviewing FIG. 3, is that certain CDP lines overlap, that is, more than one CDP line is generated for certain lateral displacements with respect to the center line of the vessel 10 because of the spacing between the sources 30, 32. Such overlapping CDP lines are indicated, for example where both reference numeral 31 and reference numeral 33 indicate the same CDP line. For the geometry shown in FIG. 3, wherein the streamers 20 extend straight behind the vessel 10, one or the other CDP line corresponding to a particular lateral offset from the vessel centerline may be omitted from the seismic data. In general, the line with the smallest offset will be retained. As such, the "maximum minimum-offset" may be reduced compared to the conventional acquisition. In the configuration of FIG. 3, the "minimum offset" for an overlapping CDP line will correspond to the shortest distance between a source (either 30 or 32) and the first sensor in either of the streamers that generated the overlapping CDP line. Illumination of shallow reflectors is directly affected by the minimum offset recorded, and for that reason a shorter minimum offset is desired, and normally the line with the smallest offset will be retained.

Figure 5:
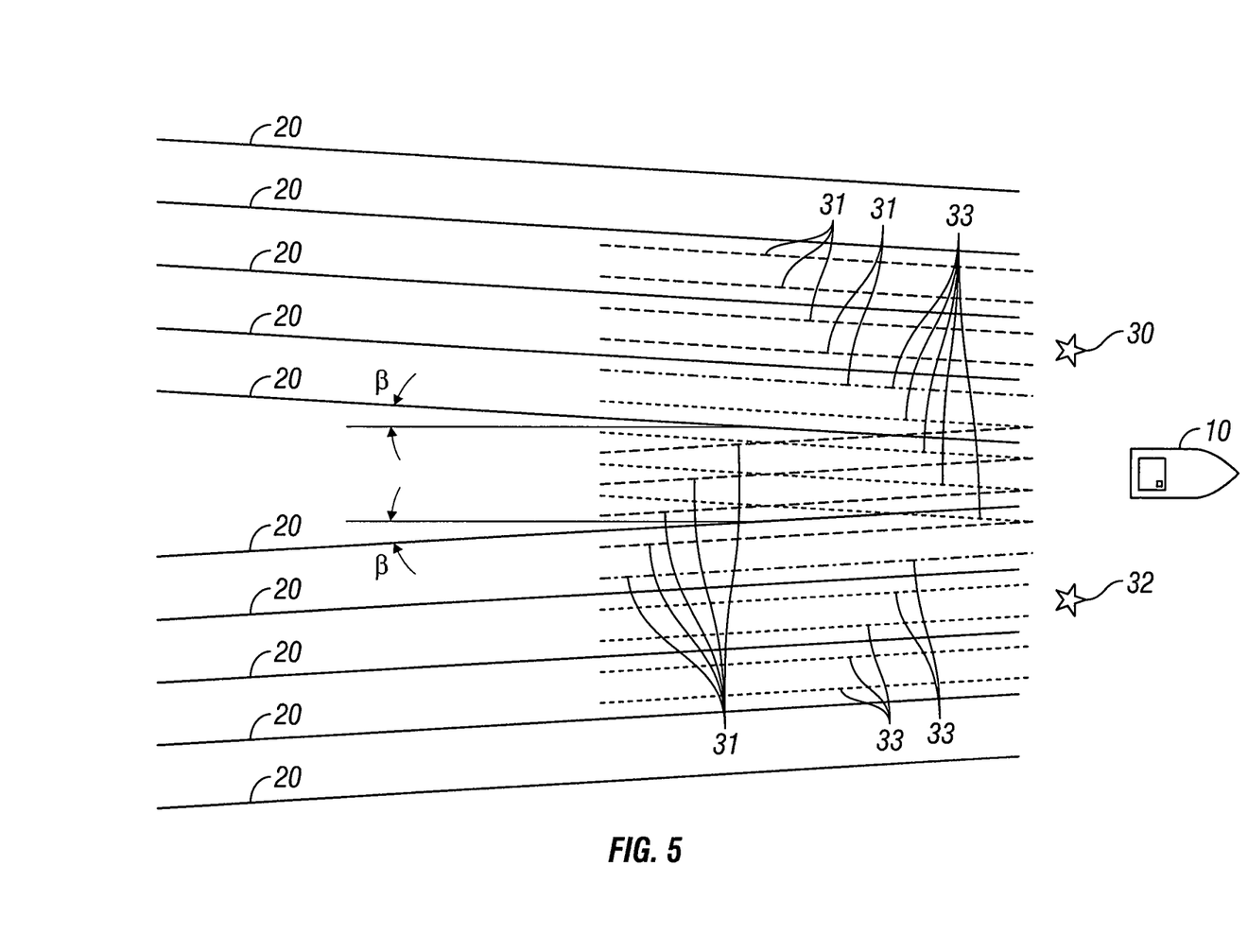
FIG. 5 shows feathering of the streamers at great distances from the vessel.

In one example, and referring to FIG. 5, it may be possible to allow the streamers 20 to assume substantially the shape they ordinarily would as a result of the "trousers effect", using the LFD devices (26 in FIG. 1) more to maintain the streamers 20 in a straight line than to attempt to return the streamers to extending straight behind the vessel, e.g., as shown in FIG. 3. In particular, the LFD devices (26 in FIG. 1) may be used to steer the streamers to have a selected spread angle between a first portion of the streamers extending behind the vessel, and a second portion of the streamers extending behind the vessel. Normally, the first portion of the streamers will be those on one side of the sail line of the vessel, and the second portion will be those on the other side of the sail line of the vessel. As explained above with reference to FIG. 3, between the lateral positions of the sources 30, 32 a number of CDP lines 31, 33 will be duplicated. In the example of FIG. 5, such duplicated or extra CDP lines 31, 33 may be used to provide subsurface coverage in the center area of the "trousers effect" streamer array, thus reducing or eliminating the need for infill coverage.

Assuming a streamer spread (trousers effect) half angle, β, of 3 degrees between the locations the steamer would have if there were no "trousers effect" and the actual location of the streamers (equivalent to a total spread angle of six degrees)

the crossline spread is increased at 6 km offset by 628 m, and is increased at 8 km offset by 837 m, where "offset" distance is the distance from the front end of the streamers to a specified distance along the streamer from the front end of the streamer. Consider a case where L=150 m and N=10, then the crossline spread is 1350 m for an acquisition where the streamers are straight behind the vessel. With a 3 degrees half angle trousers effect, the crossline spread at 6 km offset is 1978 m (47% increase), and is 2187 m at 8 km offset (62% increase). Because of the spare (additional) coverage provided by spacing the sources 30, 32 as shown, such large far-offset spreads are actually well sampled in the crossline direction and would require minimum infill coverage.

There are two converse considerations in designing a survey according to the invention: productivity gains are proportional to k (which determines the spacing between the sources) while the amount of spare coverage is proportional to N–k. If one approaches the limit with k=N (the spacing between the sources being equal to the streamer spread) the productivity would be doubled but there would be no spare coverage (and therefore no improvement by infill reduction). The foregoing, however, translates into a net productivity gain because the coverage is doubled, while infill represent generally only 20 percent to 40 percent of prime coverage.

It is also possible to tow the seismic energy sources 30, 32 from different vessels (not shown) rather than the same survey vessel 10 that tows the streamers 20 in order to facilitate maintaining the selected lateral spacing between the sources 30, 32.

Methods of acquiring seismic data according to the various aspects of the invention may provide increased efficiency over prior methods.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for towing a marine seismic acquisition array in a body of water, comprising:
    towing a plurality of laterally spaced apart sensor streamers behind a survey vessel in the water, a lateral spacing between adjacent streamers represented by L;
    towing at least two laterally spaced apart seismic energy sources behind the survey vessel, a lateral spacing between the at least two source represented by kL, wherein k is a constant and wherein k is at most equal to the number of streamers; and
    steering the sensor streamers to have a selected spread angle between a first portion of the streamers extending behind the survey vessel and a second portion of the streamers extending behind the survey vessel, the first and second portions comprising entire streamers laterally displaced on opposed sides of a sail line of the survey vessel and using seismic data from overlapping common depth point lines acquired laterally between the lateral positions of the sources to reduce infill acquisition.

2. The method of claim 1 further comprising discarding a selected one of overlapping common depth point data lines disposed between the lateral positions of the sources.

3. The method of claim 1 wherein k=4.

4. A method for marine seismic acquisition, comprising:
    towing a plurality of laterally spaced apart sensor streamers behind a survey vessel in a body of water, a lateral spacing between adjacent streamers represented by L;
    towing at least two laterally spaced apart seismic energy sources behind the survey vessel in the water, a lateral spacing between the at least two source represented by kL, wherein k is a constant and wherein k is at most equal to the number of streamers;
    at selected times actuating each of the first and the second sources;
    detecting seismic signals at each of a plurality of longitudinally spaced apart seismic sensors on each of the streamers;
    recording the detected seismic signals; and
    steering the sensor streamers to have a selected spread angle between a first portion of the streamers extending behind the survey vessel and a second portion of the streamers extending behind the survey vessel, the first and second portions comprising entire streamers laterally displaced on opposed sides of a sail line of the survey vessel and using seismic data from overlapping common depth point lines acquired laterally between the lateral positions of the sources to reduce infill acquisition.

5. The method of claim 4 further comprising discarding a selected one of overlapping common depth point data lines disposed between the lateral positions of the sources.

6. The method of claim 4 wherein k=4.

7. A method for towing a marine seismic acquisition array in a body of water, comprising:
    towing a plurality of laterally spaced apart sensor streamers behind a survey vessel in the water, a lateral spacing between adjacent streamers represented by L;
    towing at least two laterally spaced apart seismic energy sources in the water, a lateral spacing between the at least two source represented by kL, wherein k is a constant and wherein kL is at most equal to the number of streamers; and
    steering the sensor streamers to maintain a selected spread angle between a first portion of the streamers extending behind the survey vessel and a second portion of the streamers extending behind the survey vessel, and using seismic data from overlapping common depth point lines acquired laterally between the lateral positions of the sources to reduce infill acquisition, the first and second portions comprising entire streamers laterally displaced on opposed sides of a sail line of the survey vessel.

8. The method of claim 7 further comprising discarding a selected one of overlapping common depth point data lines disposed between the lateral positions of the sources.

9. The method of claim 7 wherein k=4.

10. The method of claim 7 wherein the selected spread angle is six degrees.

11. A method for marine seismic acquisition, comprising:
    towing a plurality of laterally spaced apart sensor streamers behind a survey vessel in a body of water, a lateral spacing between adjacent streamers represented by L;
    towing at least two laterally spaced apart seismic energy sources in the water, a lateral spacing between the at least two source represented by kL, wherein k is a constant and wherein k is at most equal to the number of streamers;
    steering the sensor streamers to have a selected spread angle between a first portion of the streamers extending behind a survey vessel and a second portion of the streamers extending behind the survey vessel, the first and second portions comprising entire streamers laterally displaced on opposed sides a sail line of the survey vessel;

at selected times actuating each of the first and the second sources;

detecting seismic signals at each of a plurality of longitudinally spaced apart seismic sensors on each of the streamers;

recording the detected seismic signals; and and using seismic signals recorded from overlapping common depth point lines acquired laterally between the lateral positions of the sources to reduce infill acquisition.

12. The method of claim 11 further comprising discarding a selected one of overlapping common depth point data lines disposed between the lateral positions of the sources.

13. The method of claim 11 wherein k=4.

* * * * *